United States Patent [19]

Egger et al.

[11] Patent Number: 5,032,142

[45] Date of Patent: Jul. 16, 1991

[54] TRICHROMATIC AZO DYE MIXTURES AND THEIR USE FOR DYEING CELLULOSE AND LEATHER

[75] Inventors: Walter B. Egger, Reinach; Ernst Schnider, Füllinsdorf, both of Switzerland

[73] Assignee: Sandoz Ltd., Basle, Switzerland

[21] Appl. No.: 455,690

[22] Filed: Dec. 21, 1989

[30] Foreign Application Priority Data

Dec. 22, 1988 [DE] Fed. Rep. of Germany ..... 38431459

[51] Int. Cl.$^5$ ...................... C09B 62/08; C09B 67/22; D06P 1/38; D06P 3/10
[52] U.S. Cl. .......................................... 8/549; 8/436; 8/437; 8/543; 8/680; 8/681; 8/682; 8/687; 8/688; 8/918
[58] Field of Search ..................... 8/549, 689, 641, 681

[56] References Cited

U.S. PATENT DOCUMENTS

4,338,092  7/1982  Schneider ............................. 8/549

FOREIGN PATENT DOCUMENTS

2085908  5/1982  United Kingdom.
2127840  4/1984  United Kingdom.
2151251  7/1985  United Kingdom.

Primary Examiner—A. Lionel Clingman
Attorney, Agent, or Firm—Gerald D. Sharkin; Richard E. Vila; Melvyn M. Kassenoff

[57] ABSTRACT

Trichromatic dye mixtures containing
(i) as the orange component
   at least one dye of the formula

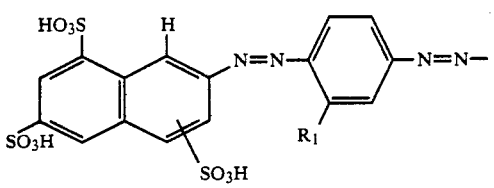

or a salt thereof,
or, as the yellow component,
   at least one dye of the formula

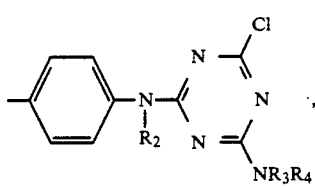

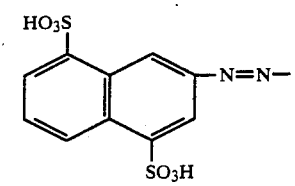

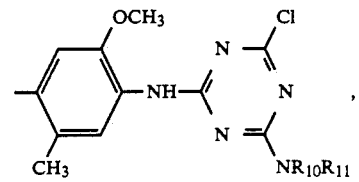

or a salt thereof,
wherein
   $R_1$ is hydrogen or $C_{1-4}$alkyl,
   $R_2$ is hydrogen, $C_{1-4}$alkyl or substituted $C_{1-4}$alkyl,
   each of $R_3$ and $R_4$ is independently hydrogen, $C_{1-6}$alkyl or substituted $C_{1-6}$alkyl,
   $R_{10}$ is hydrogen or $C_{2-3}$hydroxyalkyl, and
   $R_{11}$ is $C_{2-3}$hydroxyalkyl or 2-(2'-hydroxyethoxy)ethyl, with the proviso that when $R_{11}$ is 2-(2'-hydroxyethoxy)ethyl, $R_{10}$ must be hydrogen,
(ii) as the red component,
   at least one dye of the formula

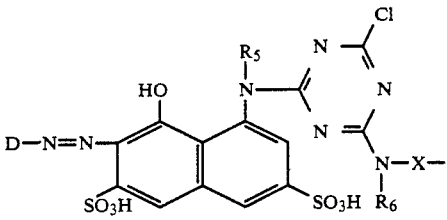

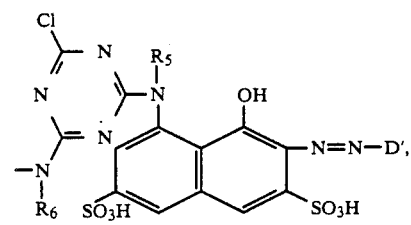

or a salt thereof,
wherein each of D and D' is independently

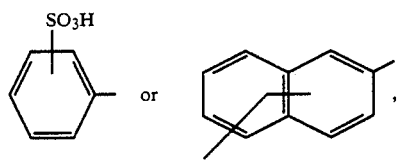

wherein m is 1 or 2,
each $R_5$ is independently hydrogen or $C_{1-4}$alkyl,
each $R_6$ is independently hydrogen, $C_{1-4}$alkyl or $C_{2-4}$hydroxyalkyl, and (Abstract continued on next page.)

x is linear or branched $C_{2-6}$alkylene, linear or branched $C_{3-6}$alkylene monosubstituted by hydroxy or linear or branched $C_{3-6}$alkylene disubstituted by hydroxy, with the proviso that the two hydroxy groups are attached to different carbon atoms, and (iii) as the blue component,
at least one dye of the formula

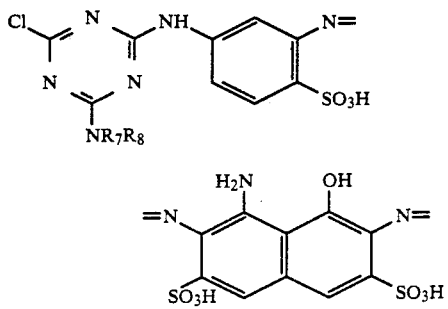

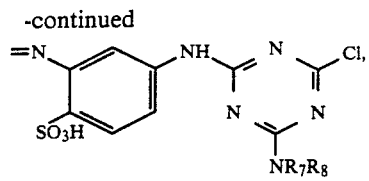

or a salt thereof,
wherein each $R_7$ is independently hydrogen or $C_{2-4}$hydroxyalkyl, and
each $R_8$ is independently $C_{2-4}$alkyl monosubstituted by hydroxy or —$OR_9$ or $C_{2-4}$alkyl disubstituted by hydroxy, with the proviso that the two hydroxy groups are attached to different carbon atoms,
wherein $R_9$ is $C_{1-4}$alkyl or $C_{2-4}$hydroxyalkyl; their use for the trichromatic dyeing of hydroxy group-containing and nitrogen-containing organic substrates, especially natural and regenerated cellulose and leather, using conventional dyeing processes and substrates dyed therewith.

20 Claims, No Drawings

TRICHROMATIC AZO DYE MIXTURES AND THEIR USE FOR DYEING CELLULOSE AND LEATHER

The invention relates to a process for trichromatic dyeing, trichromatic mixtures of dyes and materials such as hydroxy group-containing and nitrogen-containing organic substrates dyed by this process.

There is provided according to the invention a process for the trichromatic dyeing of hydroxy group-containing or nitrogen-containing organic substrates, in which (i) at least one dyestuff of formula Ia as the orange component,

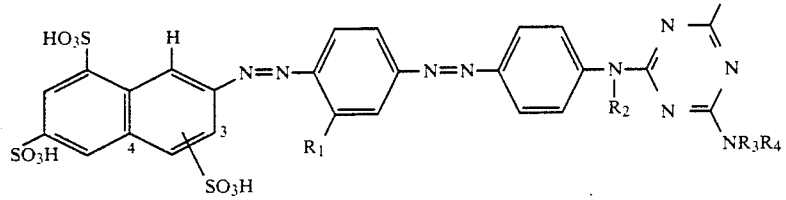

in which
$R_1$ is hydrogen or $C_{1-4}$alkyl,
$R_2$ is hydrogen or unsubstitued or substituted $C_{1-4}$alkyl and
$R_3$ and $R_4$ may be the same or different and each is hydrogen or unsubstituted or substituted $C_{1-6}$alkyl,
or a salt thereof;
or at least one dyestuff of formula Ib as the yellow component,

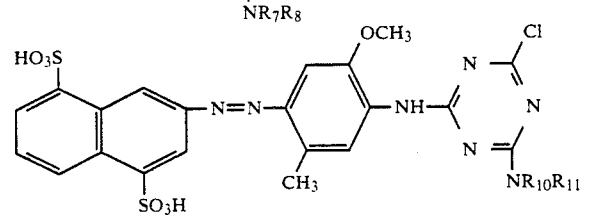

in which
$R_{10}$ is hydrogen or $C_{2-3}$hydroxyalkyl and
$R_{11}$ is $C_{2-3}$hydroxyalkyl; or
$R_{10}$ is hydrogen and
$R_{11}$ is —$CH_2CH_2OCH_2CH_2OH$, or a salt thereof;
is used together with (ii) at least one dyestuff of formula II as the red component,

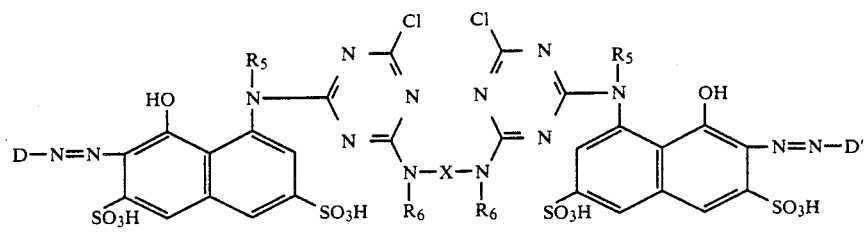

in which
each $R_5$, independently of one another, is hydrogen or $C_{1-4}$alkyl,
each $R_6$, independently of one another, is hydrogen, $C_{1-4}$alkyl or $C_{2-4}$hydroxyalkyl,
X is $C_{2-6}$alkylene- or monohydroxy- or dihydroxy-substituted $C_{3-6}$alkylene-, and
D and D' may be the same or different and each is a diazo component radical of formula (a) or (b)

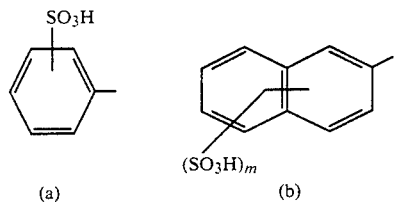

in which m is 1 or 2,
or a salt thereof; and (iii) at least one dyestuff of formula III as the blue component,

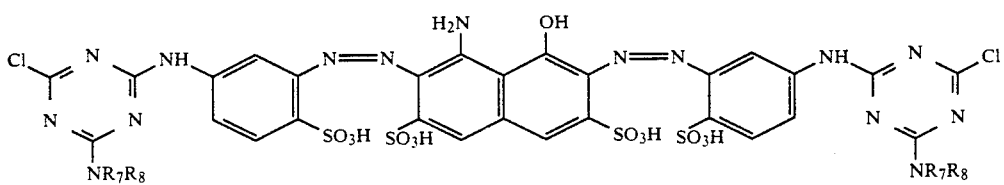

in which
each $R_7$, independently of one another, is hydrogen or $C_{2-4}$-hydroxyalkyl and
each $R_8$, independently of one another, is $C_{2-4}$alkyl which is substituted by one or two hydroxy groups or by —$OR_9$,
in which
$R_9$ is $C_{1-4}$alkyl or $C_{2-4}$hydroxyalkyl,
In compounds of formula Ia:
preferably $R_1$ is hydrogen, methyl or ethyl, most preferably $R_2$ is methyl;

or a salt thereof.

This invention further relates to trichromatic dye mixtures characterized by dyes of formulae Ia or Ib, II and III. The preferred trichromatic dye mixtures of this invention consist of at least one dye of formula Ia or Ib as the orange or yellow component, at least one dye of formula II as the red component and at least one dye of formula III as the blue component.

In the preferred trichromatic dye mixtures of this invention, the proportions of the individual dyes of the mixture lie in the range:

| Orange or yellow component | 25–65 parts by weight |
| Red component | 3–35 parts by weight |
| Blue component | 20–70 parts by weight | based upon 100 parts total quantity.

preferably when $R_2$ is substituted alkyl it is $C_{2-3}$alkyl monosubstituted by chlorine, cyano or hydroxy; preferably $R_2$ is $R_{2a}$ where $R_{2a}$ is hydrogen, methyl, ethyl or 2-hydroxyethyl; more preferably $R_{2b}$ where $R_{2b}$ is hydrogen or methyl; most preferably $R_2$ is hydrogen;

preferably when $R_3$ or $R_4$ are unsubstituted alkyl they are $C_{1-4}$alkyl, most preferably methyl or ethyl; and preferably when substituted alkyl they contain 1–4 C-atoms and are substituted by one or two hydroxy groups or by cyano, hydroxyethoxy, —COOH, —SO$_3$H or —OSO$_3$H;

preferably $R_3$ is $R_{3a}$ where $R_{3a}$ is hydrogen, methyl, ethyl, $C_{2-4}$hydroxyalkyl, —CH$_2$CH(OH)CH$_2$OH, —CH$_2$CH$_2$OCH$_2$OH, —(CH$_2$)$_{1-2}$COOH, —(CH$_2$)$_{1-2}$SO$_3$H or —(CH$_2$)$_{1-2}$OSO$_3$H; more preferably $R_3$ is $R_{3b}$ where $R_{3b}$ is hydrogen, methyl, ethyl, —CH$_2$CH$_2$OH or —CH$_2$CH$_2$OCH$_2$CH$_2$OH; more preferably $R_{3c}$ where $R_{3c}$ is hydrogen, methyl or —CH$_2$CH$_2$OH; most preferably $R_3$ is hydrogen;

preferably $R_4$ is $R_{4a}$ where $R_{4a}$ is hydrogen, methyl, ethyl, —CH$_2$CH$_2$OH or —CH$_2$CH$_2$CN; most preferably $R_4$ is hydrogen.

In compounds of formula Ib:
preferably $R_{10}$ is $R_{10a}$ where $R_{10a}$ is hydrogen or —CH$_2$CH$_2$OH; and
preferably $R_{11}$ is —CH$_2$CH$_2$OH.

In compounds of formula II:
preferably the radicals D and D′ are different and are of formula (a$_1$) or (b$_1$),

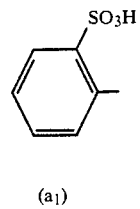 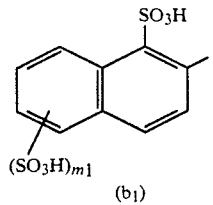

(a$_1$)     (b$_1$)

in which $m_1$ is 0 or 1;
preferably each $R_5$ is hydrogen;
preferably each $R_6$, independently of one another, is hydrogen or methyl;
preferably the bridge member X is linear or branched $C_{2-3}$-alkylene or $C_{3-4}$hydroxyalkylene.

In compounds of formula III:
preferably $R_7$ is $R_{7a}$ where $R_{7a}$ is hydrogen or —CH$_2$CH$_2$OH;
preferably $R_8$ is $R_{8a}$ where $R_{8a}$ is $C_{2-3}$hydroxyalkyl, —(CH$_2$)$_{2-3}$OC$_{1-2}$alkyl or —CH$_2$CH$_2$OCH$_2$CH$_2$OH; more preferably $R_{8b}$ where $R_{8b}$ is —CH$_2$CH$_2$OH or —CH$_2$CH$_2$OCH$_2$OH.

Especially preferred trichromatic mixtures contain (i′) at least one dyestuff of formula Ia′ as the orange component

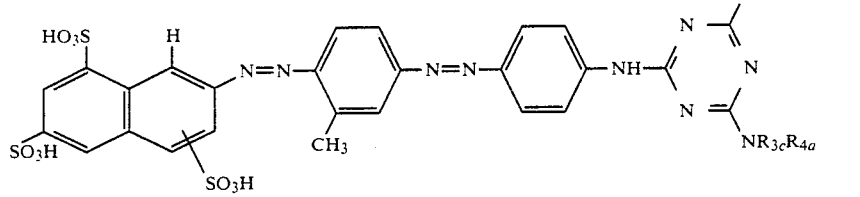

or a salt thereof;
together with
(ii′) at least one dyestuff of formula II′ as the red component,

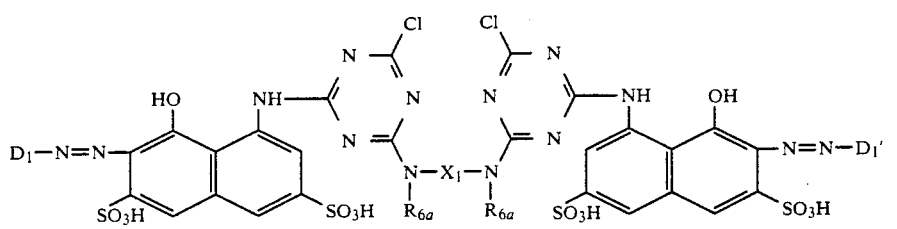

in which
each $R_{6a}$, independently of one another, is hydrogen or methyl,
$X_1$ is linear or branched $C_{2-3}$alkylene or —CH$_2$CH(OH)CH$_2$—, and
$D_1$ and $D'_1$ are different from one another and each is a radical of formula (a$_1$) or (b$_1$) or a salt thereof; and
(iii′) at least one dyestuff of formula III′ as the blue component,

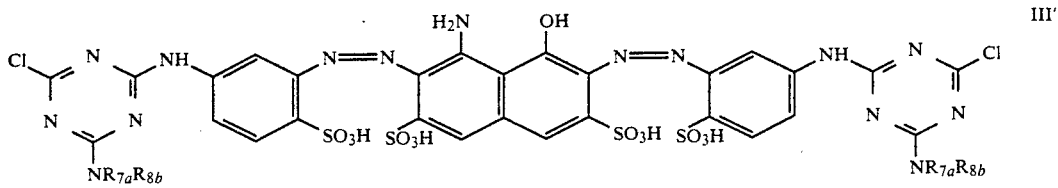

in which
both radicals $R_{7a}$ are the same and
both radicals $R_{8b}$ are the same,
or a salt thereof.

If not otherwise stated, unsubstituted or substituted alkyl or alkylene groups defined for the dyestuffs of formulae Ia, Ib, II and III may be linear or branched. In a hydroxy-substituted alkyl or alkylene group which is bonded to nitrogen, the hydroxy group is preferably not located on a C-atom which is bonded directly to nitrogen. If the alkyl or alkylene group is disubstituted, the two substituents are not located on the same C-atom.

When compounds of formulae Ia, Ib, II and III exist in salt form, the sulpho groups and optional carboxy groups may be associated with any non-chromophoric cation which is usual in the chemistry of fibre-reactive dyes. Preferred are cations which form water-soluble salts. Examples of suitable cations are alkali metal ions and unsubstituted and substituted ammonium ions, for example, lithium, sodium, potassium, ammonium, mono-, di-, tri-and tetramethylammonium, triethylammonium and mono-, di- and triethanolammonium.

The compounds of formulae Ia, Ib, II and III are known or may be obtained by analogy with known processes. For example the compounds of formula Ia may be obtained as described in GB-2 066 282; the compounds of formula Ib as described in GB-2 127 840; the compounds of formula II as described in GB-2 085 908 and the compounds of formula III as described in GB-2 151 251.

For use in dyeing as trichromatic dyes, the individual dyestuffs are mixed together. The dyestuff mixtures may thus be prepared individually as stock solutions for the dyeing process, or preferably formulated together in a single stock solution.

Such trichromatic mixtures may include, for example, mixtures of appropriate commercial dry (powder, granulate) or liquid forms, aqueous stock solutions which contain such mixtures and are obtained, e.g., by dilution with water, and dye liquors which contain the dyestuffs of formulae Ia or Ib, II and III as a trichromatic mixture.

The dyestuff mixtures may be applied in the appropriate commercial form as described above. They may contain suitable conventional standardising agents such as water-soluble salts (particularly sodium chloride, sodium carbonate and sodium sulphate), non-electrolyte type standardising agents such as dextrin and urea, and optionally further additives which are suitable for the formulation of solid or liquid preparations. If dyestuffs which are especially low in electrolytes are required, they may be obtained by purification by known osmotic means. It is also advantageous to use dyestuffs in the form of non dust-forming granules which are soluble in cold water and which are highly concentrated, pourable and stable during transport.

Any hydroxy group-containing or nitrogen-containing organic substrates are suitable for the trichromatic dyeing process according to the invention, particularly natural or regenerated cellulose, as well as leather. The substrates may exist in any form that is normally employed for dyeing especially from an aqueous medium, e.g. as loose fibers, threads, filaments, skeins, woven fabrics and knit fabrics, as well as semi-finished or ready-made goods. It is preferable to dye textile materials which consist of or contain natural or regenerated cellulose, especially cotton.

The said substrates may be dyed in accordance with normal methods, preferably by the exhaust process from an aqueous bath or when dyeing cotton, by the migration process or the all-in process (preferred for non-mercerised cotton).

The trichromatic mixtures according to the invention are trichromatic mixtures for hot-dyeing which may be used with comparable dyeing properties at dyeing temperatures in the range 85°–98° C. These trichromatic mixtures are very economical, as they cover a relatively wide range of shades, for example mixed shades in the range grey, brown, green and, in particular, medium to deep shades, due to the good build-up capability of the individual dyestuffs.

During the trichromatic dyeing of hydroxy group-containing or nitrogen-containing organic substrates, especially textile materials, compatability of the component dyestuffs employed is of great importance. The dyestuff mixtures of the present invention for use in the trichromatic dyeing process accordingly provide an even build-up of colour to attain constant shades, reproducible dyeings in various concentrations and good combinability of the individual components. It has been found that these characteristics are a surprising result of the specific mix of dyestuffs of this invention.

The affinity, migration behaviour and fixing behaviour of the components in the mixture are balanced at the dyeing temperatures used with the result that they can be combined very well. They have good solubility properties even in electrolyte-containing dyebaths, they exhaust tone-in-tone and show no catalytic fading and when using different concentrations, reproducible dyeings in a constantly stable shade with good levelness and through-dyeing are attained.

The trichromatic dyeings according to the invention have good light and wet fastness properties, the unfixed parts of the dye being easily washed out. In addition, the dyeings are relatively resistant towards oxidative influences, such as active chlorine, sodium perborate, hypochlorite bleaching or peroxide bleaching.

The following application examples are illustrative of the invention. References to parts are by weight and the temperatures are given in degrees celsius. The dyestuff components are used in commercial powder form and the quantities of dye component given as percent refer to the concentration of pure dyestuff based on the dry weight of the substrate.

APPLICATION EXAMPLE 1 (MIGRATION PROCESS)

50 parts of cotton (mercerised) are added to a dyebath consisting of 1000 parts of water, 60 parts of sodium chloride and 1.0 parts of salt of sodium salt of 1-nitrobenzene-3-sulphonate. The bath is heated to 98° over the course of 10 minutes, then the trichromatic dyestuff mixture of the following composition, consisting of components IA, IIA and IIIA, is added:

1.83% of orange component IA
(the compound of formula Ia wherein $R_1$ is —$CH_3$, $R_2$, $R_3$ and $R_4$ are H and the sulpho group is located in position 4 of the naphthyl radical; Example 8 of the table in Research Disclosure January 1985, no. 249/input 24918 on pages 49–51);

0.47% of red component IIA
(the compound of formula II, wherein D is 1-sulphonaphthyl-2 and D' is 1,5-disulphonaphthyl-2, both $R_5$ and both $R_6$ are H and X is ethylene; Example 44 of the table in GB-2 085 908);

0.59% of blue component IIIA
(corresponds to the compound of formula III, wherein each $R_7$ is H and each $R_8$ is —$CH_2CH_2OH$; Example in GB-2 151 251).

It is used in sodium salt form.

After 35 minutes at 98°, 15 parts of calcined soda are added over the course of 15 minutes, divided into three portions, the 2nd addition taking place after a further 5 minutes, and the 3rd addition after a further 10 minutes. After the soda addition, dyeing is completed at the boil for 30–60 minutes (depending on the desired depth of colour). The dyed material is then removed from the dyebath, given a hot rinse under running water, and washed at the boil for 15 minutes in 500 parts of demineralised water in the presence of 0.25 parts of Marseille soap as anion-active surfactant. After rinsing (hot and cold) and drying, an evenly through-dyed brown cotton dyeing is obtained. It is fast to light and wet and is resistant to oxidative influences.

APPLICATION EXAMPLE 2 (ALL-IN PROCESS)

A dyebath consisting of 1000 parts of water, 80 parts of sodium chloride, 20 parts of soda (calcined) and 1.0 parts of sodium 1-nitrobenzene-3-sulphonate, to which 50 parts of cotton (non-mercerised) have been added, is heated to 50°–60°. The trichromatic mixture of composition 1.00% of orange component IA
0.49% of red component IIA
and 1.70% of blue component IIIA is added in sodium salt form. The dyebath is maintained at 50°–60° for 30 minutes, then raised to 98° over the course of 30 minutes and dyeing is completed at this temperature for 60 minutes. The dyeing is removed from the bath, given a hot rinse and washed at the boil analogously to the method described in Application Example 1. After rinsing and drying, a level grey cotton dyeing is obtained with good light and wet fastness properties and resistance to oxidative influences.

As a variation of the described dyestuff mixture, so as to obtain a grey shade, a blue component IIIB with a red tint is used. This consists of 93.23 parts of blue component IIIA and 6.77 parts of C.I. Reactive Red 55 (Drimarene Rubinole X-3LR). The corresponding mixture has the composition 1.00% of orange component IA
0.31% of red component IIA
2.05% of blue component IIIB
(as sodium salts).

This grey cotton dyeing has fastness properties which are comparable with the above.

APPLICATION EXAMPLE 3

The dyeing method of Application Example 2 is employed, and the following composition is chosen as the dyestuff mixture 2.80% of orange component IA
0.31% of red component IIA
and 1.38% of blue component IIIA
(as sodium salts)

or as a variant 2.7% of orange component IA
0.2% of red component IIA
and 1.6% of blue component IIIB
(as sodium salts).

In each case, a deep and level bottle-green cotton dyeing is obtained with good fastness properties.

APPLICATION EXAMPLE 4

The dyeing method of Application Example 2 is used, and a dyestuff mixture of the following composition is chosen 1.80% of orange component IA
0.86% of red component IIA
and 1.36% of blue component IIIA
(as sodium salts).

or as a variant 1.75% of orange component IA
0.72% of red component IIA
and 1.56% of blue component IIIB
(as sodium salts).

In each case, an even brown cotton dyeing is obtained with good fastness properties.

What is claimed is:

1. A trichromatic dye mixture consisting essentially of
   (i) as the orange component,
   at least one dye of the formula

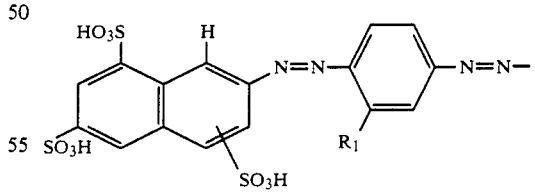

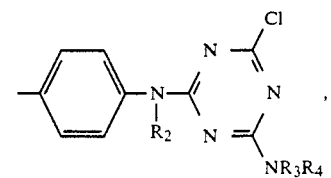

or a salt thereof,
or, as the yellow component,
at least one dye of the formula

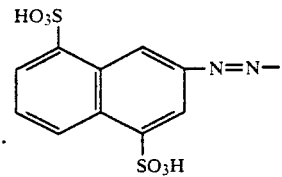

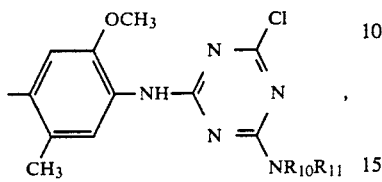

or a salt thereof,
wherein
$R_1$ is hydrogen or $C_{1-4}$alkyl,
$R_2$ is hydrogen, $C_{1-4}$alkyl or substituted $C_{1-4}$alkyl,
each of $R_3$ and $R_4$ is independently hydrogen, $C_{1-6}$alkyl or substituted $C_{1-6}$alkyl,
$R_{10}$ is hydrogen or $C_{2-3}$hydroxyalkyl, and
$R_{11}$ is $C_{2-3}$hydroxyalkyl or 2-(2'-hydroxyethoxy)ethyl, with the proviso that when $R_{11}$ is 2-(2'-hydroxyethoxy)ethyl, $R_{10}$ must be hydrogen,
(ii) as the red component,
at least one dye of the formula

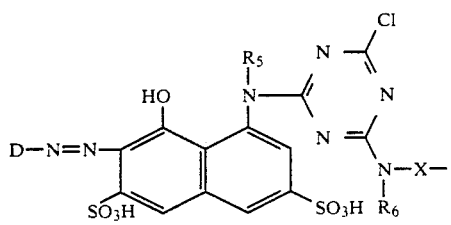

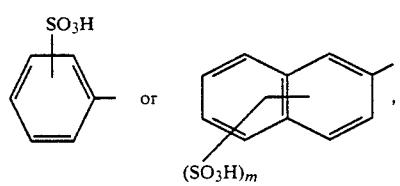

or a salt thereof,
wherein each of D and D' is independently

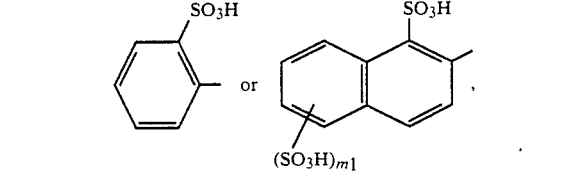

wherein m is 1 or 2,
each $R_5$ is independently hydrogen or $C_{1-4}$alkyl,
each $R_6$ is independently hydrogen, $C_{1-4}$alkyl or $C_{2-4}$hydroxyalkyl, and
X is linear or branched $C_{2-6}$alkylene, linear or branched $C_{3-6}$alkylene monosubstituted by hydroxy or linear or branched $C_{3-6}$alkylene disubstituted by hydroxy, with the proviso that the two hydroxy groups are attached to different carbon atoms, and
(iii) as the blue component,
at least one dye of the formula or a salt thereof,
wherein
each $R_7$ is independently hydrogen or $C_{2-4}$hydroxyalkyl, and
each $R_8$ is independently $C_{2-4}$alkyl monosubstituted by hydroxy or —$OR_9$ or $C_{2-4}$alkyl disubstituted by hydroxy, with the proviso that the two hydroxy groups are attached to different carbon atoms,
wherein $R_9$ is $C_{1-4}$alkyl or $C_{2-4}$hydroxyalkyl said trichromatic dye mixture containing, per 100 parts by weight of the total amount of Components (i), (ii), and (iii), 25-65 parts by weight of Component (i) 3-35 parts by weight of Component (ii) and 20-70 parts by weight of Component (iii).

2. A trichromatic dye mixture according to claim 1 wherein $R_2$ is hydrogen, $C_{1-4}$alkyl or $C_{2-3}$alkyl monosubstituted by chloro, cyano or hydroxy,
each of $R_3$ and $R_4$ is independently hydrogen; $C_{1-6}$alkyl; $C_{1-4}$alkyl monosubstituted by hydroxy, cyano, hydroxyethoxy, carboxy, sulfo or sulfato; or $C_{1-4}$alkyl disubstituted by hydroxy, with the proviso that the two hydroxy groups are attached to different carbon atoms, and
each cation is a non-chromophoric cation, with the proviso that each hydroxy group of each alkyl group and linear or branched alkylene radical that is monosubstituted or disubstituted by hydroxy and attached to a nitrogen atom is attached to a carbon atom other than a carbon atom directly attached to the nitrogen atom.

3. A trichromatic dye mixture according to claim 2 wherein each of D and D' is independently wherein $m_1$ is 0 or 1,
with the proviso that D and D' are different,
$R_1$ is hydrogen, methyl or ethyl,
$R_2$ is hydrogen, methyl, ethyl or 2-hydroxyethyl,
$R_3$ is hydrogen, methyl, ethyl, $C_{2-4}$hydroxyalkyl, 2,3-dihydroxypropyl, 2-(2'-hydroxyethoxy)ethyl, —$(CH_2)_n$—COOH, —$(CH_2)_n$—$SO_3H$ or —$(CH_2)_n$—O—$SO_3H$, wherein n is 1 or 2,
$R_4$ is hydrogen, methyl, ethyl, 2-hydroxyethyl or 2-cyanoethyl,
each $R_5$ is hydrogen,
each $R_6$ is independently hydrogen or methyl,
each $R_7$ is hydrogen or 2-hydroxyethyl,
each $R_8$ is $C_{2-3}$hydroxyalkyl, —$(CH_2)_p$—O—$C_{1-2}$alkyl or 2-(2'-hydroxyethoxy)ethyl, wherein p is 2 or 3,

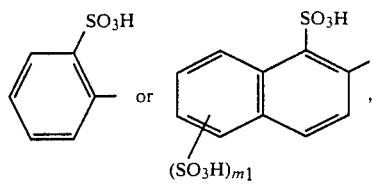

wherein $m_1$ is 0 or 1,
with the proviso that $D_1$ and $D_1'$ are different,
each $R_{6a}$ is independently hydrogen or methyl, and
$X_1$ is linear or branched $C_{2-3}$alkylene or 2-hydroxy-1,3-propylene, and
(iii) as the blue component,
at least one dye of the formula

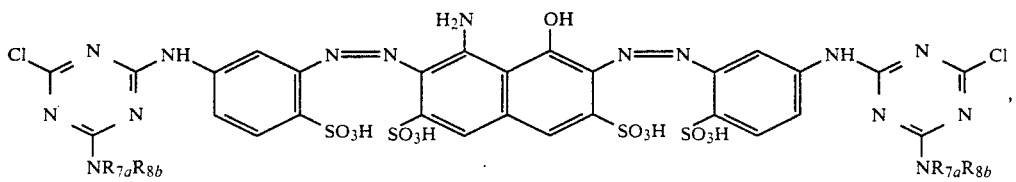

$R_{10}$ is hydrogen or 2-hydroxyethyl,
$R_{11}$ is 2-hydroxyethyl, and X is linear or branched $C_{2-3}$alkylene or linear or branched $C_{3-4}$alkylene monosubstituted by hydroxy.

4. A trichromatic dye mixture according to claim 3 consisting essentially of
(i) as the orange component,
at least one dye of the formula

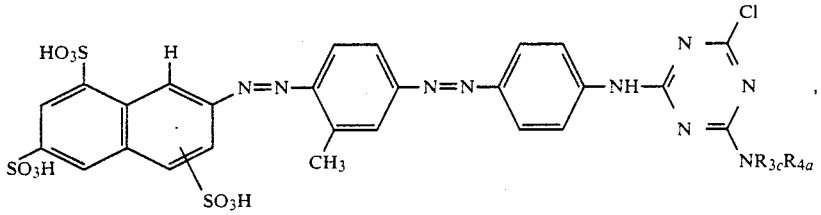

or a salt thereof each cation of which is a nonchromophoric cation,
wherein
each $R_{7a}$ is hydrogen or 2-hydroxyethyl, with the proviso that the two $R_{7a}$'s are identical, and
each $R_{8b}$ is 2-hydroxyethyl or 2-(2'-hydroxyethoxy)-ethyl, with the proviso that the two

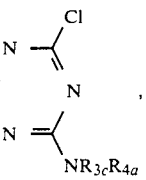

or a salt thereof each cation of which is a nonchromophoric cation,
wherein
$R_{3c}$ is hydrogen, methyl or 2-hydroxyethyl, and
$R_{4a}$ is hydrogen, methyl, ethyl, 2-hydroxyethyl or 2-cyanoethyl,
(ii) as the red component,
at least one dye of the formula $R_{8b}$'s are identical.
5. A trichromatic dye mixture according to claim 4 wherein each cation is lithium, sodium, potassium, ammonium, methylammonium, dimethylammonium, trimethylammonium, tetramethylammonium, triethylammonium, ethanolammonium, diethanolammonium or triethanolammonium.

6. A trichromatic dye mixture according to claim 1

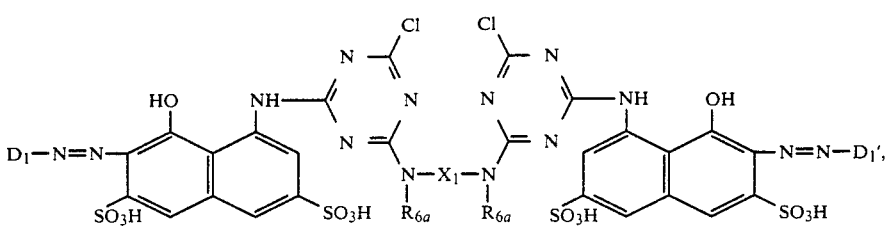

or a salt thereof each cation of which is a nonchromophoric cation,
wherein each of $D_1$ and $D_1'$ is independently wherein each cation is lithium, sodium, potassium, ammonium, methylammonium, dimethylammonium, trimethylammonium, tetramethylammonium, triethylammonium, ethanolammonium, diethanolammonium or triethanolammonium.

7. An hydroxy group-containing or nitrogen-containing organic substrate to which a trichromatic dye mixture according to claim 1 was applied.

8. An hydroxy group-containing organic substrate or leather to which a trichromatic dye mixture according to claim 5 was applied.

9. An hydroxy group-containing organic substrate or leather to which a trichromatic dye mixture according to claim 6 was applied.

10. A process for the trichromatic dyeing of an hydroxy group-containing organic substrate with a fiber-reactive dye mixture comprising applying to an hydroxy group-containing organic substrate
(i) as the orange component,
at least one dye of the formula

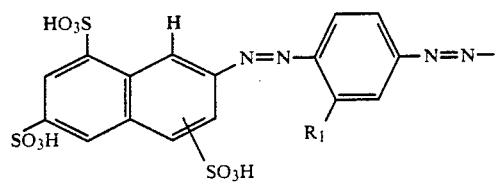

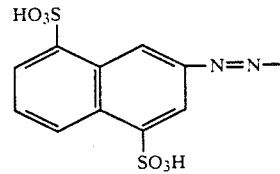

or a salt thereof,
or, as the yellow component,
at least one dye of the formula

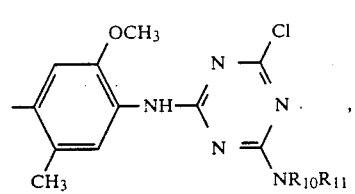

or a salt thereof,
wherein
R$_1$ is hydrogen or C$_{1-4}$alkyl,
R$_2$ is hydrogen, C$_{1-4}$alkyl or substituted C$_{1-4}$alkyl,
each of R$_3$ and R$_4$ is independently hydrogen, C$_{1-6}$alkyl or substituted C$_{1-6}$alkyl,
R$_{10}$ is hydrogen or C$_{2-3}$hydroxyalkyl, and
R$_{11}$ is C$_{2-3}$hydroxyalkyl or 2-(2'-hydroxyethoxy)ethyl, with the proviso that when R$_{11}$ is 2-(2'-hydroxyethoxy)ethyl, R$_{10}$ must be hydrogen,
(ii) as the red component,
at least one dye of the formula

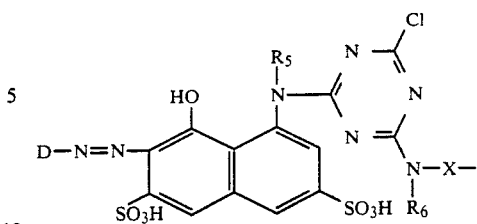

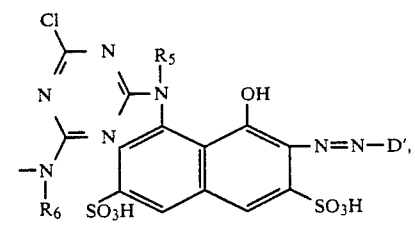

or a salt thereof,
wherein each of D and D' is independently

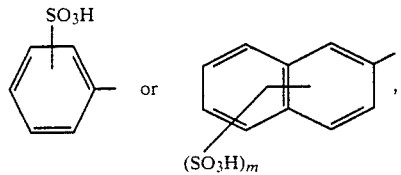

wherein m is 1 or 2,
each R$_5$ is independently hydrogen or C$_{1-4}$alkyl,
each R$_6$ is independently hydrogen, C$_{1-4}$alkyl or C$_{2-4}$hydroxyalkyl, and
X is linear or branched C$_{2-6}$alkylene, linear or branched C$_{3-6}$alkylene monosubstituted by hydroxy or linear or branched C$_{3-6}$alkylene disubstituted by hydroxy, with the proviso that the two hydroxy groups are attached to different carbon atoms, and
(iii) as the blue component,
at least one dye of the formula

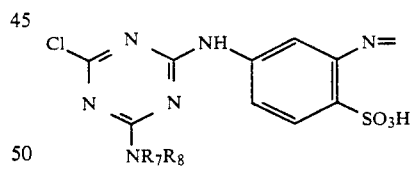

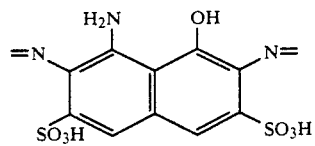

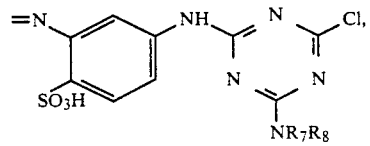

or a salt thereof,
wherein
each R$_7$ is independently hydrogen or C$_{2-4}$hydroxyalkyl, and each $R_8$ is independently $C_{2-4}$alkyl monosubstituted by hydroxy or —$OR_9$ or $C_{2-4}$alkyl disubstituted by hydroxy, with the proviso that the two hydroxy groups are attached to different carbon atoms, wherein $R_9$ is $C_{1-4}$alkyl or $C_{2-4}$hydroxyalkyl said fiber-reactive dye mixture containing, per 100 parts by weight of the total amounts of Components (i), (ii) and (iii), 25–65 parts by weight of Component (i), 3–35 parts by weight of Component (ii) and 20–70 parts by weight of Component (iii).

11. An exhaust dyeing process according to claim 10 wherein the organic substrate is a textile material comprising a natural or regenerated cellulose.

12. A process according to claim 10
wherein $R_2$ is hydrogen, $C_{1-4}$alkyl or $C_{2-3}$alkyl monosubstituted by chloro, cyano or hydroxy,
each of $R_3$ and $R_4$ is independently hydrogen; $C_{1-6}$alkyl; $C_{1-4}$alkyl monosubstituted by hydroxy, cyano, hydroxyethoxy, carboxy, sulfo or sulfato; or $C_{1-4}$alkyl disubstituted by hydroxy, with the proviso that the two hydroxy groups are attached to different carbon atoms, and
each cation is a non-chromophoric cation,
with the proviso that each hydroxy group of each alkyl group and linear or branched alkylene radical that is monosubstituted or disubstituted by hydroxy and attached to a nitrogen atom is attached to a carbon atom other than a carbon atom directly attached to the nitrogen atom.

13. A process according to claim 12
wherein each of D and D' is independently

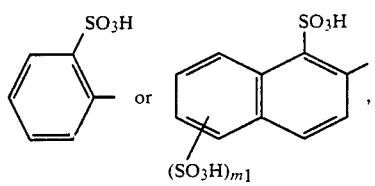

wherein $m_1$ is 0 or 1,
with the proviso that D and D' are different,
$R_1$ is hydrogen, methyl or ethyl,
$R_2$ is hydrogen, methyl, ethyl or 2-hydroxyethyl,
$R_3$ is hydrogen, methyl, ethyl, $C_{2-4}$hydroxyalkyl, 2,3-dihydroxypropyl, 2-(2'-hydroxyethoxy)ethyl, —$(CH_2)_n$—COOH, —$(CH_2)_n$—$SO_3H$ or —$(CH_2)_n$—O—$SO_3H$, wherein n is 1 or 2,
$R_4$ is hydrogen, methyl, ethyl, 2-hydroxyethyl or 2-cyanoethyl,
each $R_5$ is hydrogen,
each $R_6$ is independently hydrogen or methyl,
each $R_7$ is hydrogen or 2-hydroxyethyl,
each $R_8$ is $C_{2-3}$hydroxyalkyl, —$(CH_2)_p$—O—$C_{1-2}$alkyl or 2-(2'-hydroxyethoxy)ethyl, wherein p is 2 or 3,
$R_{10}$ is hydrogen or 2-hydroxyethyl,
$R_{11}$ is 2-hydroxyethyl, and X is linear or branched $C_{2-3}$alkylene or linear or branched $C_{3-4}$alkylene monosubstituted by hydroxy.

14. A process according to claim 13 comprising applying to an hydroxy group-containing organic substrate or leather
(i) as the orange component,
at least one dye of the formula

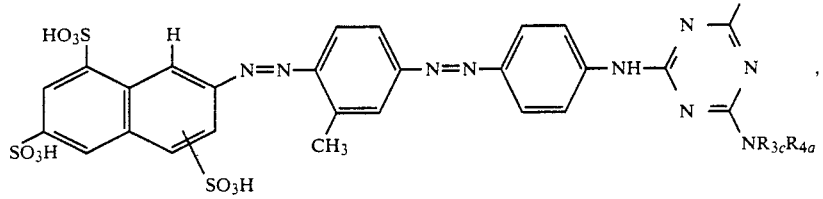

or a salt thereof each cation of which is a non-chromophoric cation,
wherein
$R_{3c}$ is hydrogen, methyl or 2-hydroxyethyl, and
$R_{4a}$ is hydrogen, methyl, ethyl, 2-hydroxyethyl or 2-cyanoethyl,
(ii) as the red component,
at least one dye of the formula

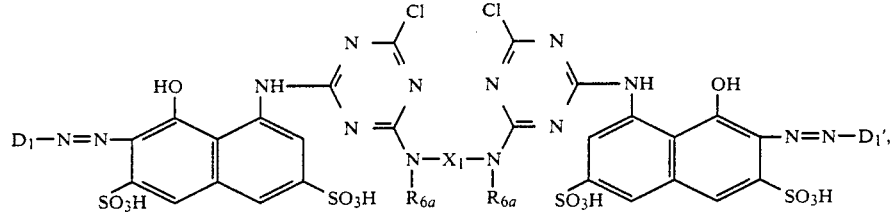

or a salt thereof each cation of which is a non-chromophoric cation,
wherein
each of $D_1$ and $D_1'$ is independently

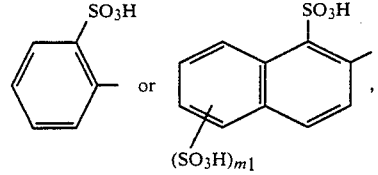

wherein $m_1$ is 0 or 1,
with the proviso that $D_1$ and $D_1'$ are different,
each $R_{6a}$ is independently hydrogen or methyl, and $X_1$ is linear or branched $C_{2-3}$alkylene or 2-hydroxy-1,3-propylene, and
(iii) as the blue component,
at least one dye of the formula

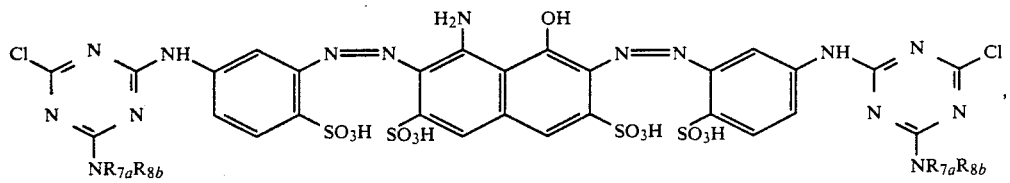

or a salt thereof each cation of which is a non-chromophoric cation,
wherein
each $R_{7a}$ is hydrogen or 2-hydroxyethyl, with the proviso that the two $R_{7a}$'s are identical, and
each $R_{8b}$ is 2-hydroxyethyl or 2-(2'-hydroxyethoxy)ethyl, with the proviso that the two $R_{8b}$'s are identical.

15. A process according to claim 14 wherein each cation is lithium, sodium, potassium, ammonium, methylammonium, dimethylammonium, trimethylammonium, tetramethylammonium, triethylammonium, ethanolammonium, diethanolammonium or triethanolammonium.

16. A trichromatic dye mixture according to claim 1 consisting of
(i) as the orange component,
at least one dye of the formula

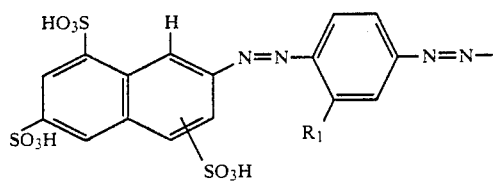

or a salt thereof,
or, as the yellow component,
at least one dye of the formula

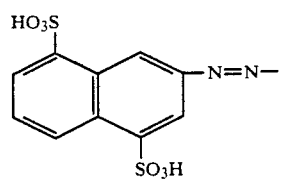

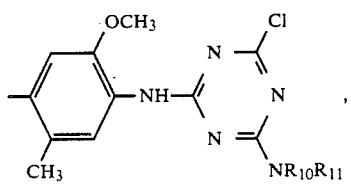

or a salt thereof,
(ii) as the red component,
at least one dye of the formula

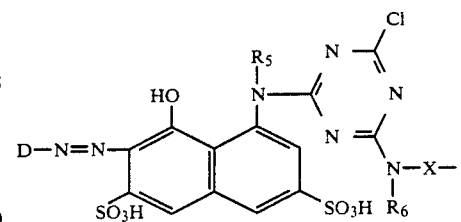

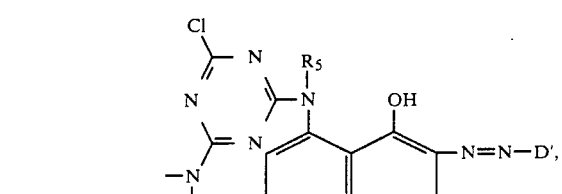

or a salt thereof, and
(iii) as the blue component,
at least one dye of the formula

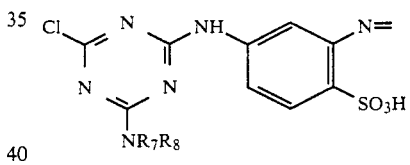

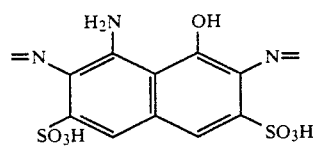

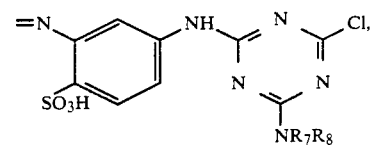

or a salt thereof.

17. A trichromatic dye mixture according to claim 16 wherein $R_2$ is hydrogen, $C_{1-4}$alkyl or $C_{2-3}$alkyl monosubstituted by chloro, cyano or hydroxy,
each of $R_3$ and $R_4$ is independently hydrogen; $C_{1-6}$alkyl; $C_{1-4}$alkyl monosubstituted by hydroxy, cyano, hydroxyethoxy, carboxy, sulfo or sulfato; or $C_{1-4}$alkyl disubstituted by hydroxy, with the proviso that the two hydroxy groups are attached to different carbon atoms, and
each cation is a non-chromophoric cation, with the proviso that each hydroxy group of each alkyl group and linear or branched alkylene radical that is monosubstituted or disubstituted by hydroxy and attached to a nitrogen atom is attached to a carbon atom other than a carbon atom directly attached to the nitrogen atom.

18. A trichromatic dye mixture according to claim 17 wherein each cation is lithium, sodium, potassium, ammonium, methylammonium, dimethylammonium, trimethylammonium, tetramethylammonium, triethylammonium, ethanolammonium, diethanolammonium or triethanolammonium.

19. A trichromatic dye mixture according to claim 4 consisting of
(i) as the orange component,
at least one dye of the formula

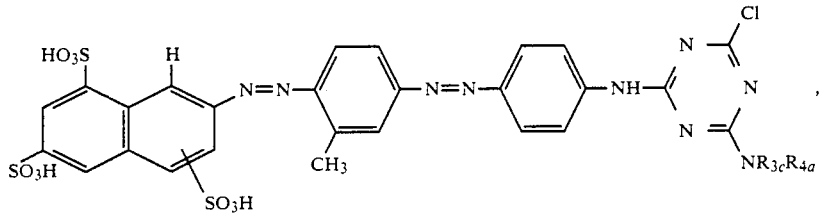

or a salt thereof each cation of which is a non-chromophoric cation, (ii) as the red component,
at least one dye of the formula

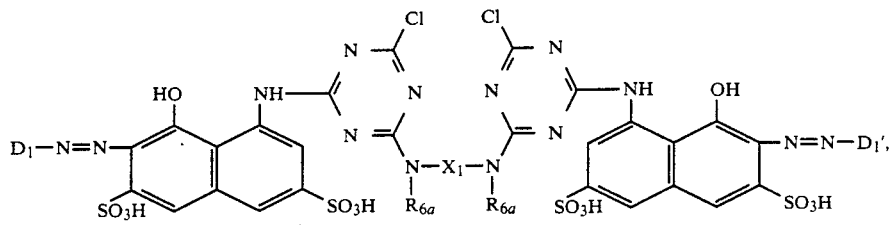

or a salt thereof each cation of which is a non-chromophoric cation, and (iii) as the blue component,
at least one dye of the formula

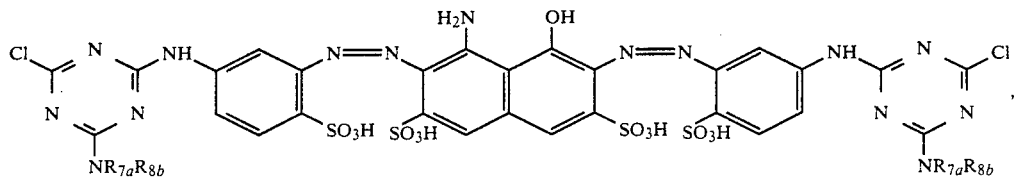

or a salt thereof each cation of which is a non-chromophoric cation.

20. A trichromatic dye mixture according to claim 19 wherein each cation is lithium, sodium, potassium, ammonium, methylammonium, dimethylammonium, trimethylammonium, tetramethylammonium, triethylammonium, ethanolammonium, diethanolammonium or triethanolammonium.

* * * * *